(12) United States Patent
Wang et al.

(10) Patent No.: US 12,508,492 B2
(45) Date of Patent: Dec. 30, 2025

(54) CHEERLEADING TRAINING SYSTEM

(71) Applicants: Christopher Wang, Katy, TX (US);
James Vidal Volpi, Houston, TX (US);
Audrey Faye Gutierrez, Cypress, TX (US); Jeremiah Randle, Katy, TX (US)

(72) Inventors: Christopher Wang, Katy, TX (US);
James Vidal Volpi, Houston, TX (US);
Audrey Faye Gutierrez, Cypress, TX (US); Jeremiah Randle, Katy, TX (US)

( * ) Notice: Subject to any disclaimer, the term of this patent is extended or adjusted under 35 U.S.C. 154(b) by 395 days.

(21) Appl. No.: 18/456,473

(22) Filed: Aug. 25, 2023

(65) Prior Publication Data
US 2025/0065212 A1 Feb. 27, 2025

(51) Int. Cl.
*G09B 19/00* (2006.01)
*A63B 71/06* (2006.01)

(52) U.S. Cl.
CPC .. *A63B 71/0622* (2013.01); *A63B 2071/0625* (2013.01); *A63B 2071/0655* (2013.01); *A63B 2071/0694* (2013.01); *A63B 2220/40* (2013.01); *A63B 2220/56* (2013.01); *A63B 2225/74* (2020.08); *G09B 19/00* (2013.01)

(58) Field of Classification Search
None
See application file for complete search history.

(56) References Cited

U.S. PATENT DOCUMENTS

| | | |
|---|---|---|
| 1,155,721 A | 10/1915 | Golly |
| 8,033,925 B2 | 10/2011 | Hardage |
| 9,301,563 B2 * | 4/2016 | Hardy ............... A41D 19/0031 |
| 9,597,567 B1 | 3/2017 | Tran et al. |
| 9,743,861 B2 | 8/2017 | Giedwoyn et al. |
| 10,065,074 B1 | 9/2018 | Hoang et al. |
| 10,070,817 B1 | 9/2018 | Matak et al. |

(Continued)

FOREIGN PATENT DOCUMENTS

| | | |
|---|---|---|
| CN | 107803009 | 8/2020 |
| WO | 2012165880 | 9/2013 |

OTHER PUBLICATIONS

"Smart Glove Usage Possibility for Basketball Training: Proof of Concept"; Oks et al.; Web <https://www.researchgate.net/profile/Aleksander-Oks-2/publication/333256168_SMART_GLOVE_USAGE_POSSIBILITY_FOR_BASKETBALL_TRAINING_PROOF_OF_CONCEPT/links/5cf438d292851c4dd0240865/SMART-GLOVE-USAGE-POSSIBILITY-FOR-BASKETBALL-TRAINING-PROOF-OF-CONCEPT.pdf>; May 2019.

(Continued)

*Primary Examiner* — James B Hull

(57) ABSTRACT

The present invention relates to a cheerleading training system. The cheerleading training system uses sensors implemented on training gloves to measure pressures imposed on cheerleaders' hands, as well as the acceleration of the cheerleaders' hands. Each training glove may have a microprocessor that contains target measurements that are compared to the pressure and acceleration measurements obtained by the sensors of the training gloves. Each training glove may have at least one LED and/or a buzzer that provide feedback to the cheerleaders depending on whether the measured pressures and accelerations meet the target measurements. This allows the cheerleaders to adjust their technique, and thereby perform a cheerleading stunt more safely. The pressure and acceleration measurements may also be transmitted to a coach's device via a transmitter.

20 Claims, 8 Drawing Sheets

(56) References Cited

U.S. PATENT DOCUMENTS

| | | |
|---|---|---|
| 10,420,387 B2 * | 9/2019 | Zambriski ............ A61B 5/6806 |
| 11,511,156 B2 | 11/2022 | Shavit |
| 2007/0196799 A1 * | 8/2007 | Romcevich .......... A63B 71/143 |
| | | 434/247 |
| 2015/0233779 A1 | 8/2015 | Chen et al. |
| 2017/0095178 A1 | 4/2017 | Schoen et al. |
| 2017/0319937 A1 | 11/2017 | Nevell |
| 2018/0333079 A1 * | 11/2018 | Székely ............... A61B 5/6805 |
| 2022/0187918 A1 | 6/2022 | Nieman |

OTHER PUBLICATIONS

"Can the SOLIDshot smart sleeve make me good at basketball?"; Chaim Gartenberg; Web <https://www.theverge.com/circuitbreaker/2016/8/19/12553426/can-the-solidshot-smart-sleeve-make-me-good-at-basketball>; Aug. 19, 2016.

"Analysis of Wrist Motion During Basketball Shooting"; Ohnishi et al.; Web <https://link.springer.com/chapter/10.1007/978-4-431-65874-0_5>; retrieved Feb. 28, 2023.

"Finger and Palm Dynamic Pressure Monitoring for Basketball Shooting"; Hung et al.; Web <https://www.hindawi.com/journals/js/2017/9352410/>; May 23, 2017.

* cited by examiner

CHEERLEADING TRAINING SYSTEM

BACKGROUND OF THE INVENTION

The present invention relates to the field of athletics, specifically the sport of cheerleading. Cheerleading is a sport in which participants (referred to as "cheerleaders") motivate the fans and participants of another sport such as but not limited to football, basketball, volleyball, etc. Basic cheerleading includes verbal chants and simple body movements. However, more advanced cheerleading includes intense physical movements. Some of these intense physical movements put the cheerleaders in danger of bodily harm. These movements are often referred to as "stunts" or "cheerleading stunts". Cheerleading stunts may include cheerleaders being lifted or thrown into the air, which puts them and other cheerleaders at risk of bodily harm if a cheerleader lands incorrectly or is not lowered correctly by the other cheerleaders.

Due to the danger of cheerleading stunts, cheerleading is known to cause very serious injuries, including spinal injuries and concussions. Furthermore, cheerleading is often given less recognition as a sport than other sports such as football, basketball, baseball, etc. Therefore, there are less highly-trained cheerleading coaches than coaches of other sports. This leads to a lack of proper training in cheerleaders, which exacerbates the danger of the sport.

SUMMARY OF THE INVENTION

The present invention relates to a cheerleading training system. The cheerleading training system uses sensors implemented on training gloves to measure pressures imposed on cheerleaders' hands, as well as the acceleration of the cheerleaders' hands. Each training glove may have a microprocessor that contains target measurements that are compared to the pressure and acceleration measurements obtained by the sensors of the training gloves. Each training glove may have at least one LED and/or a buzzer that provide feedback to the cheerleaders depending on whether the measured pressures and accelerations meet the target measurements. This allows the cheerleaders to adjust their technique, and thereby perform a cheerleading stunt more safely. The pressure and acceleration measurements may also be transmitted to a coach's device via a transmitter.

Each training glove of the cheerleading training system may have 5 finger portions and palm portion. Pressure sensors may be configured in each finger portion and/or the palm portion. A microprocessor, transmitter, accelerometer, buzzer, and at least one LED may be configured in the palm portion of each training glove. A rechargeable battery and a Qi charging module may also be configured in the palm portion of each training glove. Target pressure measurements and target acceleration measurements may be stored in the microprocessor of each training glove in the form of non-transitory computer-readable media. A training glove may be worn on each hand of each cheerleader.

A cheerleading stunt may be performed by cheerleaders known as "catchers" and a "flier". Catchers may lift or toss the flier into the air during cheerleading stunts (the term "raise" when used herein may mean "lift" or "toss"). The catchers must support the flier when raising the flier into the air and when lowering the flier back down. If a catcher places a hand in the wrong position, does not perform a movement within a required timeframe, or does not have an adequate hold on another cheerleader, then they may be at risk of causing the flier or another catcher bodily harm when a cheerleading stunt is performed.

To perform a cheerleading stunt, the catchers may first hold the flier in a first position. The cheerleaders may then cause the flier to be raised from the first position to a second position. The catchers may either maintain contact with the flier in the second position ("lifting" the flier), or may break contact with the flier in the second position ("tossing" the flier). The flier may then be lowered, by gravity alone or by aid of the catchers, to a third position. The catchers may catch the flier when the flier is lowered from the second position to the third position. These stunts may be performed with any number of catchers and fliers. However, it is common to see stunts performed by 1 flier and 2 catchers, 1 flier and 3 catchers, or 1 flier and 4 catchers. This description describes a cheerleading stunt being performed with 1 flier. This description further describes pressure measurements and acceleration measurements being obtained from 1 flier. This does not limit the invention to being used in a cheerleading stunt with more than 1 flier.

During a cheerleading stunt, the pressure sensors of the training gloves worn by the catchers may obtain catcher first position pressure measurements, which are measurements of the pressures imposed on the catchers' fingers and/or palms when the flier is in the first position. The microprocessor of each training glove worn by the catchers may compare the catcher first position pressure measurements of its respective training glove to target pressure measurements. The at least one LED of a training glove worn by the catchers may display a favorable color if the catcher first position pressure measurements obtained by the pressure sensors on said training glove meet or exceed the target pressure measurements. The at least one LED may continue displaying a favorable color until a pressure measurement obtained by a pressure sensor on that training glove does not meet or exceed the target pressure measurements. The at least one LED on a training glove worn by the catchers may display an unfavorable color if any of the catcher first position pressure measurements obtained by the pressure sensors on said training glove do not meet or exceed the target pressure measurements. The at least one LED on said training glove may then display a favorable color again once all the catcher first position pressure measurements obtained by the pressure sensors on said training glove meet or exceed the target pressure measurements.

The catcher first position pressure measurements are important to obtain to ensure that all catchers have an adequate grip on each other and on the flier. If one or more catchers have an inadequate grip, it can result in the flier falling while in the first position, or while being raised from the first position to the second position. Falling can result in an injury.

The pressure sensors of the training gloves worn by the flier may obtain flier first position pressure measurements, which are measurements of the pressures imposed on the flier's fingers and/or palms when the flier is in the first position. The microprocessor of each training glove worn by the flier may compare the flier first position pressure measurements of its respective training glove to the target pressure measurements. The at least one LED of a training glove worn by the flier may display a favorable color if the flier first position pressure measurements obtained by the pressure sensors on said training glove meet or exceed the target pressure measurements. The at least one LED may continue displaying a favorable color until a pressure measurement obtained by a pressure sensor on that training glove does not meet or exceed the target pressure measurements. The at least one LED on a training glove worn by the flier may display an unfavorable color if any of the flier first position pressure measurements obtained by the pressure sensors on said training glove do not meet or exceed the target pressure measurements. The at least one LED on said training glove may then display a favorable color again once all the flier first position pressure measurements obtained by the pressure sensors on said training glove meet or exceed the target pressure measurements.

The flier first position pressure measurements are important to obtain to ensure that the flier has adequate balance while in the first position. If the flier does not have adequate balance in the first position, it can result in the flier falling while in the first position, or while being raised from the first position to the second position. Falling can result in an injury.

The pressure sensors of the training gloves worn by the catchers may obtain catcher third position pressure measurements, which are measurements of the pressures imposed on the catchers' fingers and/or palms when the flier is in the third position. The microprocessor of each training glove worn by the catchers may compare the catcher third position pressure measurements of its respective training glove to the target pressure measurements. The at least one LED of a training glove worn by the catchers may display a favorable color if the catcher third position pressure measurements obtained by the pressure sensors on said training glove meet or exceed the target pressure measurements. The at least one LED may continue displaying a favorable color until a pressure measurement obtained by a pressure sensor on that training glove does not meet or exceed the target pressure measurements. The at least one LED on a training glove worn by the catchers may display an unfavorable color if any of the catcher third position pressure measurements obtained by the pressure sensors on said training glove do not meet or exceed the target pressure measurements. The at least one LED on said training glove may then display a favorable color again once all the catcher third position pressure measurements obtained by the pressure sensors on said training glove meet or exceed the target pressure measurements.

The catcher third position pressure measurements are important to obtain to ensure that the catchers bear the weight of the flier evenly when catching the flier. If one or more catchers bear the majority of the weight of the flier, said catchers may drop the flier, resulting in injury.

During cheerleading stunts wherein contact between the catchers and the flier is maintained during the second position, the pressure sensors of the training gloves worn by the catchers may obtain catcher second position pressure measurements, which are measurements of the pressures imposed on the catchers' fingers and/or palms when the flier is in the second position. The microprocessor of each training glove worn by the catchers may compare the catcher second position pressure measurements of its respective training glove to the target pressure measurements. The at least one LED of a training glove worn by the catchers may display a favorable color if the catcher second position pressure measurements obtained by the pressure sensors on said training glove meet or exceed the target pressure measurements. The at least one LED may continue displaying a favorable color until a pressure measurement obtained by a pressure sensor on that training glove does not meet or exceed the target pressure measurements. The at least one LED on a training glove worn by the catchers may display an unfavorable color if any of the catcher second position pressure measurements obtained by the pressure sensors on said training glove do not meet or exceed the target pressure measurements. The at least one LED on said training glove may then display a favorable color again once all the catcher second position pressure measurements obtained by the pressure sensors on said training glove meet or exceed the target pressure measurements.

The catcher second position pressure measurements are important to obtain to ensure that all catchers have an adequate grip on the flier. If one or more catchers has an inadequate grip, it can result in the flier falling while in the second position, which can result in injury. The catcher second position pressure measurements are also important to obtain to ensure that the catchers bear the weight of the flier evenly when the flier is in the second position. If one or more catchers bear the majority of the weight of the flier, said catchers may drop the flier, resulting in injury.

During a cheerleading stunt, the accelerometers of the training gloves worn by the catchers may obtain catcher acceleration measurements, which are measurements of the accelerations of the catchers' hands when the catchers cause the flier to be raised from the first position to the second position. The microprocessor of each training glove worn by the catchers may compare the catcher acceleration measurements of its respective training glove to target acceleration measurements. The at least one LED of a training glove worn by the catchers may display a favorable color if the catcher acceleration measurements obtained by the accelerometer on said training glove meet or exceed the target acceleration measurements. The at least one LED on a training glove worn by the catchers may display an unfavorable color if any of the catcher acceleration measurements obtained by the accelerometer on said training glove do not meet or exceed the target acceleration measurements.

Catcher acceleration measurements are important to obtain to ensure that all catchers are raising the flier at similar accelerations. If one or more catchers raise the flier at an acceleration that is greater than that of the other catchers, the flier may lose their balance and fall, resulting in injury.

Each training glove may have a buzzer. The buzzer of a training glove may emit a noise and/or a vibration if a pressure measurement obtained by any of the pressure sensors on said training glove does not meet or exceed the target pressure measurements. The buzzer of a training glove may also emit a noise and/or vibration if an acceleration measurement obtained by the accelerometer on said training glove does not meet or exceed the target acceleration measurements. The vibration of the buzzer may provide tactile feedback to the cheerleaders that a pressure measurement does not meet or exceed the target pressure measurements, or that an acceleration measurement does not meet or exceed the target acceleration measurements.

The "noise" and "vibration" described herein as being emitted by the buzzer may be a series of noises and a series of vibrations. The series of noises may comprise noises of the same duration, volume, and pitch. Alternatively, the series of noises may increase in duration, volume, and/or pitch as said series increases. The series of vibrations may comprise vibrations of the same duration and intensity. Alternatively, the series of vibrations may comprise vibrations that increase in duration and/or intensity as said series increases.

A favorable color may be but is not limited to a shade of green, blue, or white. These are colors that are generally associated with positive feedback in athletics and other fields. An unfavorable color may be but is not limited to a shade of red, yellow, or orange. These are colors that are generally associated with negative feedback in athletics and other fields. When any of the at least one LED of a training glove display an unfavorable color, the unfavorable color may be noticed by any of the cheerleaders or a coach. Adjustments may then be made by the cheerleaders with the goal of having all pressure measurements of all the training gloves meet or exceed the target pressure measurements. Adjustments may also be made by the cheerleaders with the goal of having all acceleration measurements of all the training gloves meet or exceed the target acceleration measurements.

Each glove may have a transmitter that may transmit the pressure measurements obtained by the pressure sensors of said training glove to the coach's device in the form of non-transitory computer-readable media. The transmitter of each training glove may also transmit the acceleration measurements obtained by the accelerometer of said training glove to the coach's device in the form of non-transitory computer-readable media. The transmitter may use established technology known to transmit information in the form of non-transitory computer-readable media, such as but not limited to Bluetooth, Wi-Fi, or the like.

The target pressure measurements may be stored in the microprocessor of each training glove in the form of non-transitory computer-readable media. The target pressure measurements may be one target pressure measurement or a range of target pressure measurements. The target pressure measurements may be different for each cheerleader. The target pressure measurements may be adjusted based on factors such as but not limited to the weight of the flier, the desired height of the flier in the second position, the size of the catchers, or the experience level of the cheerleaders. The target pressure measurements may further be different for each pressure sensor of the training gloves, since it may be desired for a part of a cheerleader's hand to receive a greater pressure than another part. For example, when a catcher supports a flier, it may be desirable for the catcher's palm to receive a greater pressure than the catcher's pinky finger.

The target pressure measurements may have target pressure measurement tolerance bands. In any training glove, if the pressure measurements obtained by the pressure sensors of said training glove are within the target pressure measurement tolerance bands, the at least one LED of said training glove may display a favorable color. In any training glove, if any pressure measurements obtained by the pressure sensors of said training glove are outside of the target pressure measurement tolerance bands, the at least one LED of said training glove may display an unfavorable color. Target pressure measurement tolerance bands may be useful to determine if too much pressure is being imposed on the hand of a cheerleader. For example, using target pressure measurement tolerance bands may aid in determining if one catcher is bearing most of the weight of a flier, in which case the pressure measurements obtained by the pressure sensors on the training gloves worn by said catcher would be above the target pressure measurement tolerance bands.

The target pressure measurements may be target catcher first position pressure measurements, target catcher second position pressure measurements, target flier first position pressure measurements, and target catcher third position pressure measurements. The target catcher first position pressure measurements, target catcher second position pressure measurements, target flier first position pressure measurements, and target catcher third position pressure measurements may each be one or more target pressure measurement, and may each have target pressure measurement tolerance bands. A target catcher first position pressure measurement, target catcher second position pressure measurement, target flier first position pressure measurement, and target catcher third position pressure measurement may all be different pressure values.

The catcher first position pressure measurements obtained by the pressure sensors may be compared to the target catcher first position pressure measurements by the microprocessor. The catcher second position pressure measurements obtained by the pressure sensors may be compared to the target catcher second position pressure measurements by the microprocessor. The flier first position pressure measurements obtained by the pressure sensors may be compared to the target flier first position pressure measurements by the microprocessor. The catcher third position pressure measurements obtained by the pressure sensors may be compared to the target catcher third position pressure measurements by the microprocessor.

The present invention may further relate to a method for performing a cheerleading stunt. The method may utilize the cheerleading training system described herein. They method may be performed by a group of cheerleaders. The cheerleaders may be catchers and fliers. The flier may be one or more flier. This description describes the method being performed by 1 flier. This does not limit the method to being performed by only 1 flier.

The training gloves described herein may be provided. Enough training gloves may be provided to allow for each cheerleader to wear a training glove on each hand. For example, if the method is performed by 4 cheerleaders, then 8 training gloves may be provided. Each cheerleader may don a training glove on each hand. The catchers and flier may assume the first position. The catchers may cause the flier to be raised from the first position to the second position. The catchers may maintain contact with the flier while the flier is in the second position. Alternatively, the catchers may break contact with the flier while the flier is in the second position. The flier may be lowered from the second position to the third position, either by gravity alone or with aid from the catchers. The catchers may catch the flier when the flier is lowered from the second position to the third position.

When performing the method, the pressure sensors may obtain the various pressure measurements described herein, and may compare said pressure measurements to the various target pressure measurements described herein using the microprocessor of the training gloves. The accelerometers may obtain the acceleration measurements described herein, and may compare said acceleration measurements to the target acceleration measurements described herein. The at least one LED and the buzzer of the training gloves may provide feedback to the cheerleaders based on whether the pressure measurements meet or exceed the target pressure measurements, and based on whether the acceleration measurements meet or exceed the target acceleration measurements. The cheerleaders may recognize negative feedback from the cheerleading training system (a sound and/or vibration from a buzzer or an unfavorable color from one of the at least one LED) and modify their technique accordingly. Alternatively, a coach may recognize negative feedback from the cheerleading training system and suggest that the cheerleaders modify their technique accordingly.

Modification of technique may be holding the arm, hand, shoulder, etc. of another cheerleader tighter if the cheerleading training system indicates that a pressure measurement does not meet or exceed the target pressure measurements. This may be done in an effort for cheerleaders to have an adequate grip on each other so that the flier does not fall and sustain an injury. Modification of technique may also be a catcher raising the flier faster or slower if the cheerleading training system indicates that an acceleration measurement does not meet or exceed the target acceleration measurements. This may be done in an effort for all catchers to raise the flier at the same acceleration.

DETAILED DESCRIPTION

The description provided herein describes example embodiments of the present invention and is not intended to limit the invention to any particular embodiment, feature, size, shape, design, material, or any other property. Furthermore, the figures provided herein show example embodiments of the present invention and are not intended to limit the invention to any particular embodiment, feature, size, shape, design, material, or any other property.

Figure 1:
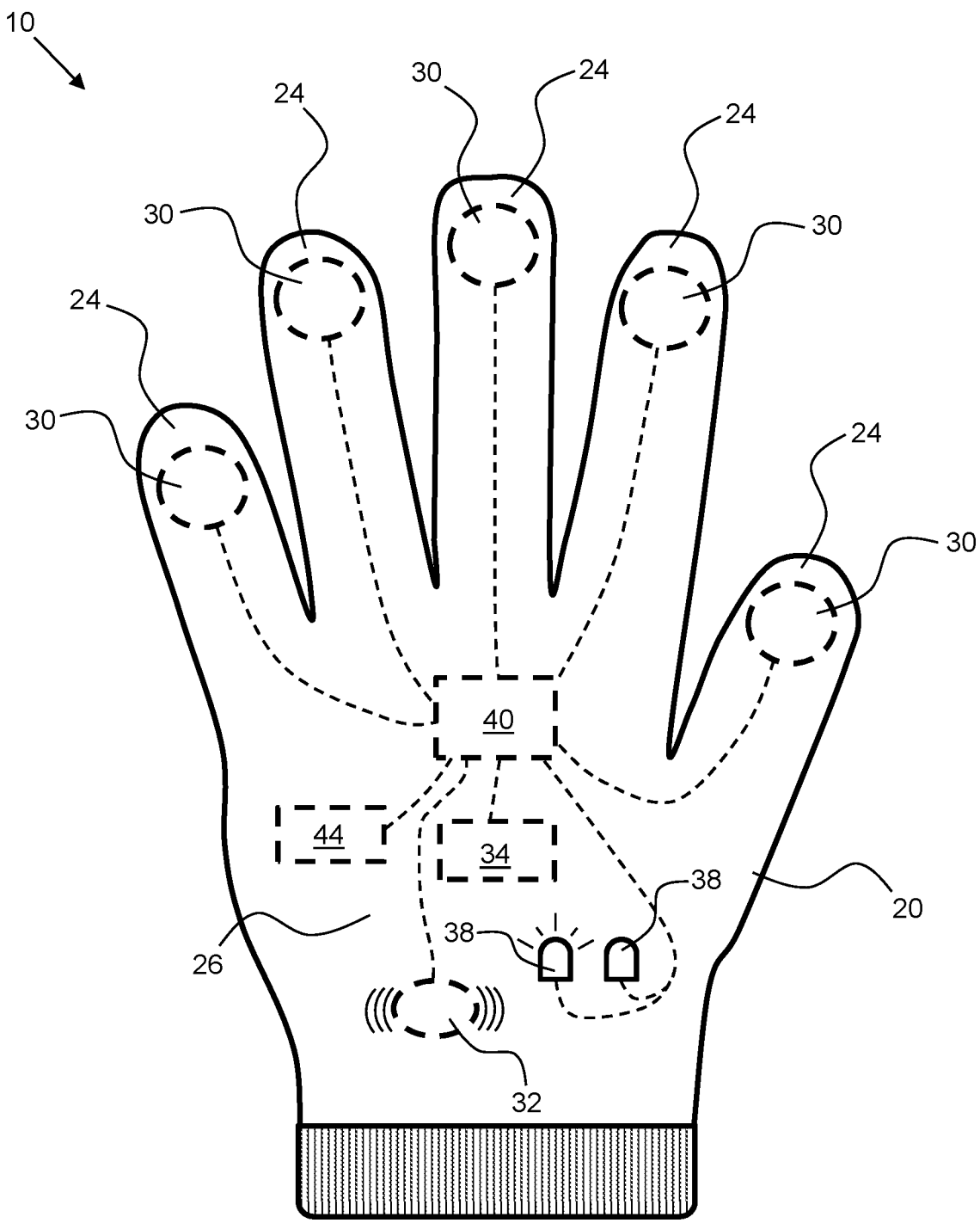
FIG. 1 shows a front view of a training glove of a cheerleading training system. The broken lines in FIG. 1 depict features of the training glove that are hidden from view.

As shown in FIG. 1, a training glove 20 of a cheerleading training system 10 has five finger portions 24 and a palm portion 26. A pressure sensor 30 is configured in each finger portion 24. One or more pressure sensors may also be configured in the palm portion 26, though this is not shown in FIG. 1. The pressure sensors 30 are electronically connected to a microprocessor 40, which is configured in the palm portion 26. An accelerometer 34 and transmitter 44 are also configured in the palm portion 26 and are also electronically connected to the microprocessor 40.

Two light-emitting diodes (LEDs) 38 are also configured in the palm portion 26. One of the two LEDs 38 may display a favorable color if pressure measurements obtained by the pressure sensors 30 meet or exceed target pressure measurements, or if acceleration measurements obtained by the accelerometer 34 meet or exceed target acceleration measurements. The other of the two LEDs 38 may display an unfavorable color if the pressure measurements obtained by the pressure sensors 30 do not meet or exceed the target pressure measurements, or if the acceleration measurements obtained by the accelerometer 34 do not meet or exceed the target acceleration measurements. As shown in FIG. 1, one of the two LEDs 38 is lit-up (displaying a color).

A buzzer 32 is also configured in the palm portion 26. The buzzer 32 may emit a noise and/or vibrate to provide tactile feedback if pressure measurements obtained by the pressure sensors 30 do not meet or exceed target pressure measurements. The buzzer 32 may also emit a noise and/or vibrate to provide tactile feedback if acceleration measurements obtained by the accelerometer 34 do not meet or exceed the target acceleration measurements.

Not shown in FIG. 1 are a rechargeable battery and a Qi charging module, which may each be configured in the palm portion 26 of the training glove 20 shown in FIG. 1. A current may be induced into the Qi charging module through induction when the Qi charging module is configured within close proximity to a wireless charger. The current induced into the Qi charging module may be directed to the rechargeable battery to charge the rechargeable battery. This allows the rechargeable battery to be charged without replacing the battery and without plugging the battery into a wall outlet or other power source. The rechargeable battery may power the other components of the training glove 20 including but not limited to the pressure sensors 30, microprocessor 40, accelerometer 34, transmitter 44, buzzer 32, and LEDs 38.

Figure 2:
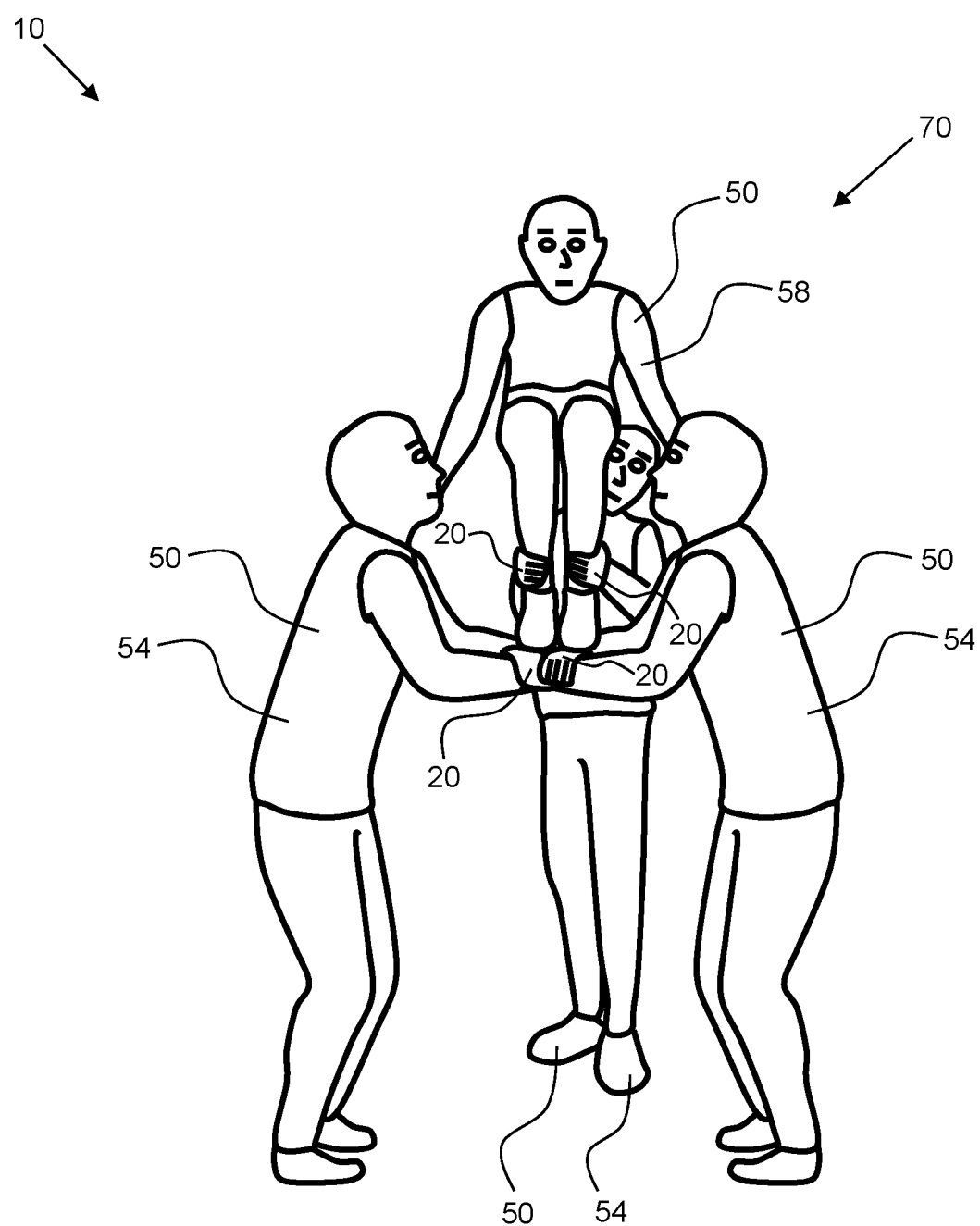
FIG. 2 shows four cheerleaders (3 catchers and 1 flier) in a first position.

As shown in FIG. 2, four cheerleaders 50 are in a first position 70 wherein three catchers 54 hold one flier 58 whereby the catchers 54 support the flier 58 with their arms and hands. Two of the catchers 58 grasp each other's arms to form a support on which the flier 54 stands. The other catcher 58 grasps the flier's legs. The flier 54 rests their hands on the shoulders of two of the catchers 58. Each cheerleader 50 wears a training glove 20 on each of their hands whereby the training gloves 20 may measure the pressures imposed on each of the cheerleaders' hands, as well as the acceleration of each cheerleaders' hands.

Figure 3:
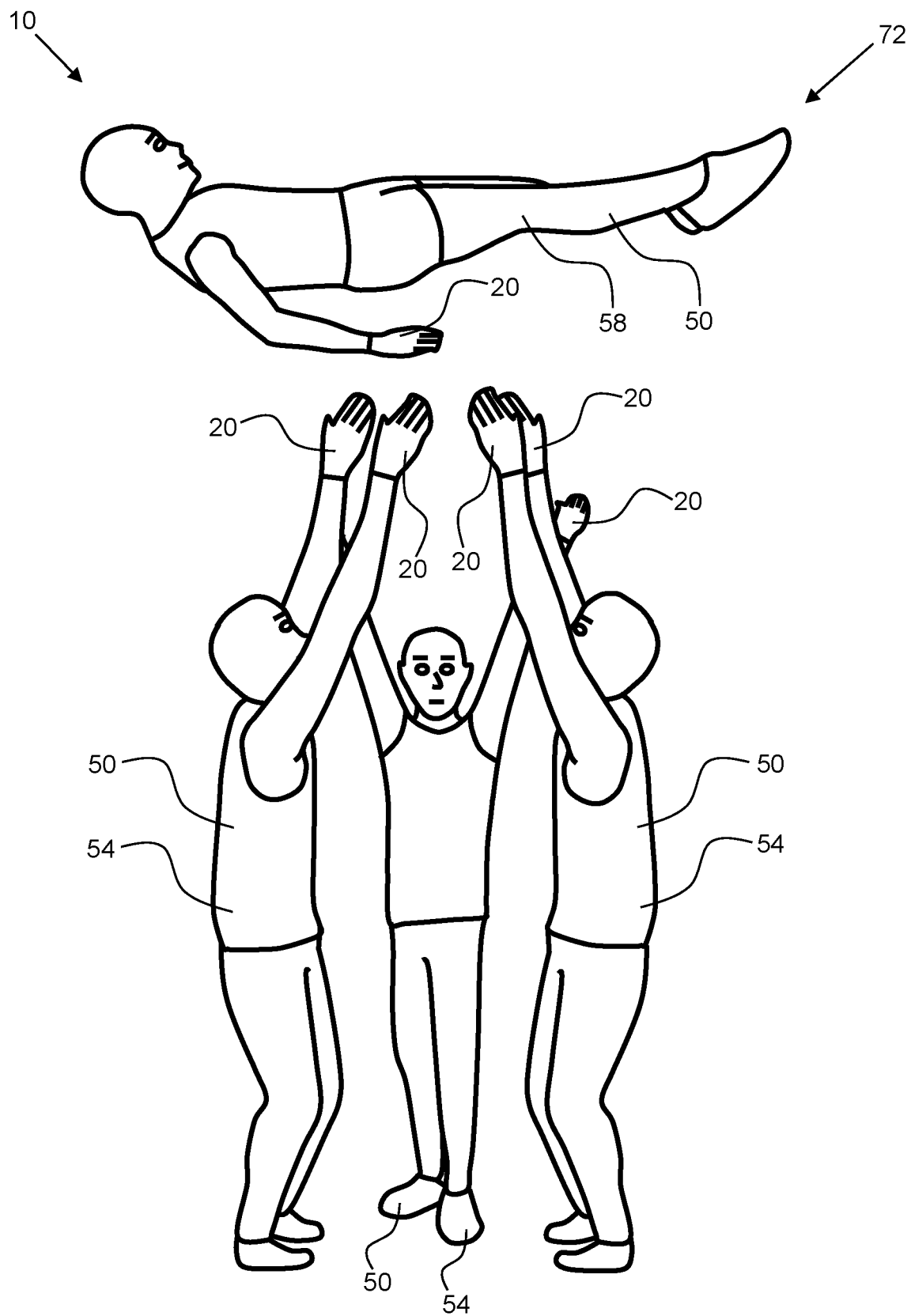
FIG. 3 shows four cheerleaders (3 catchers and 1 flier) in a second position, wherein there is no contact between the catchers and the flier.

As shown in FIG. 3, the four cheerleaders 50 of FIG. 2 are in a second position 72. The catchers 54 have caused the flier 58 to be raised into the second position 72. As shown in FIG. 2, there is no contact between the catchers 54 and the flier 58 in the second position 72. This is often referred to as a "basket toss stunt". As in FIG. 1, each cheerleader 50 wears a training glove 20 on each hand whereby the training gloves 20 may measure the pressures imposed on each of the cheerleaders' hands, as well as the acceleration of each of the cheerleaders' hands.

Figure 4:
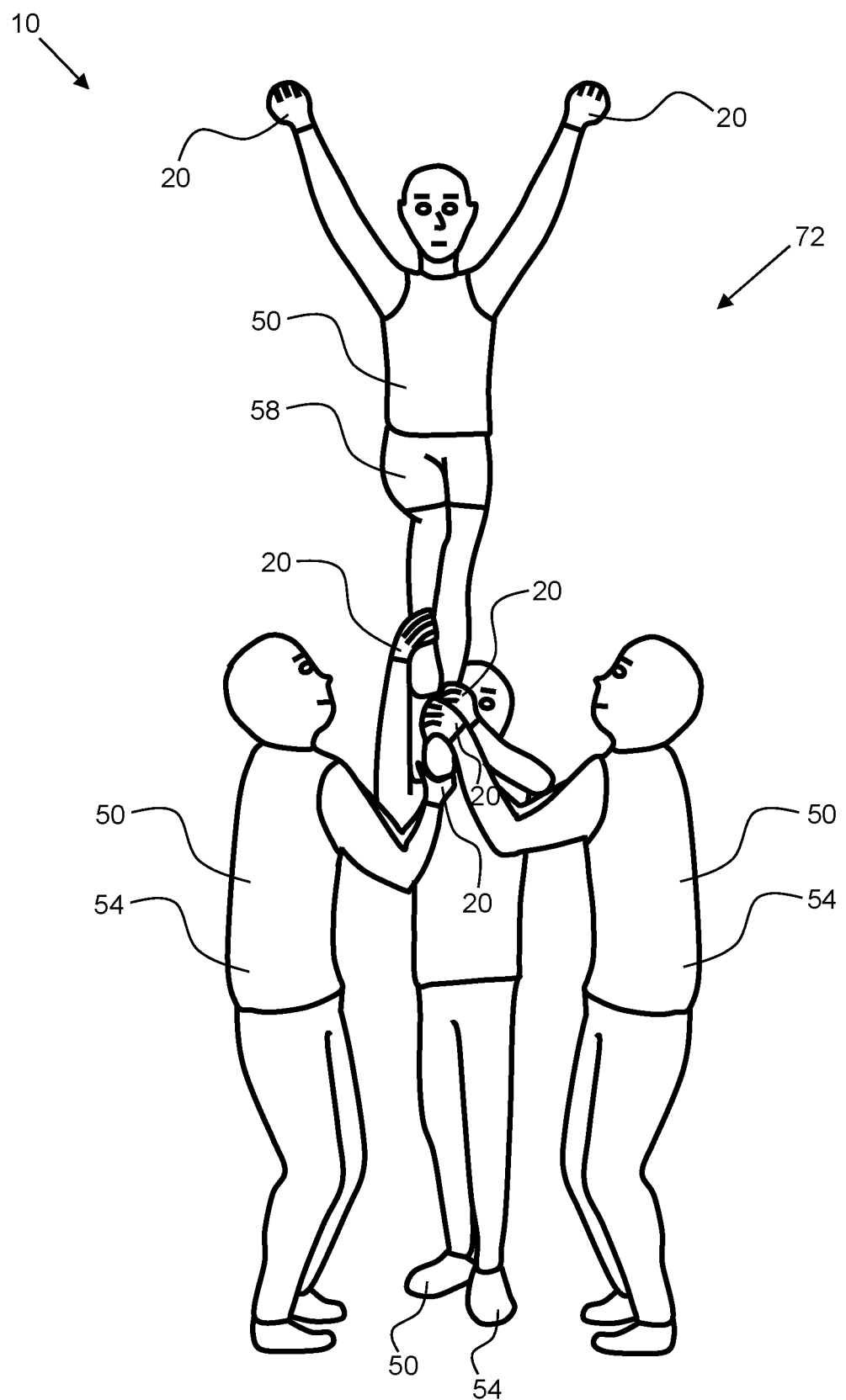
FIG. 4 shows four cheerleaders (3 catchers and 1 flier) in a second position, wherein there is contact between the catchers and the flier.

As shown in FIG. 4, the four cheerleaders 50 are also in a second position 72, except that in FIG. 4 there is contact between the catchers 54 and the flier 58. The catchers 54 have caused the flier 58 to be raised into the second position 72, but the catchers 54 support the flier 58 with their hands while the flier 58 is in the second position 72. This is often referred to as a "liberty stunt". Each cheerleader wears a training glove 20 on each hand, whereby the training gloves 20 may measure the pressures imposed on each of the cheerleaders' hands, as well as the acceleration of each if the cheerleaders' hands.

Figure 5:
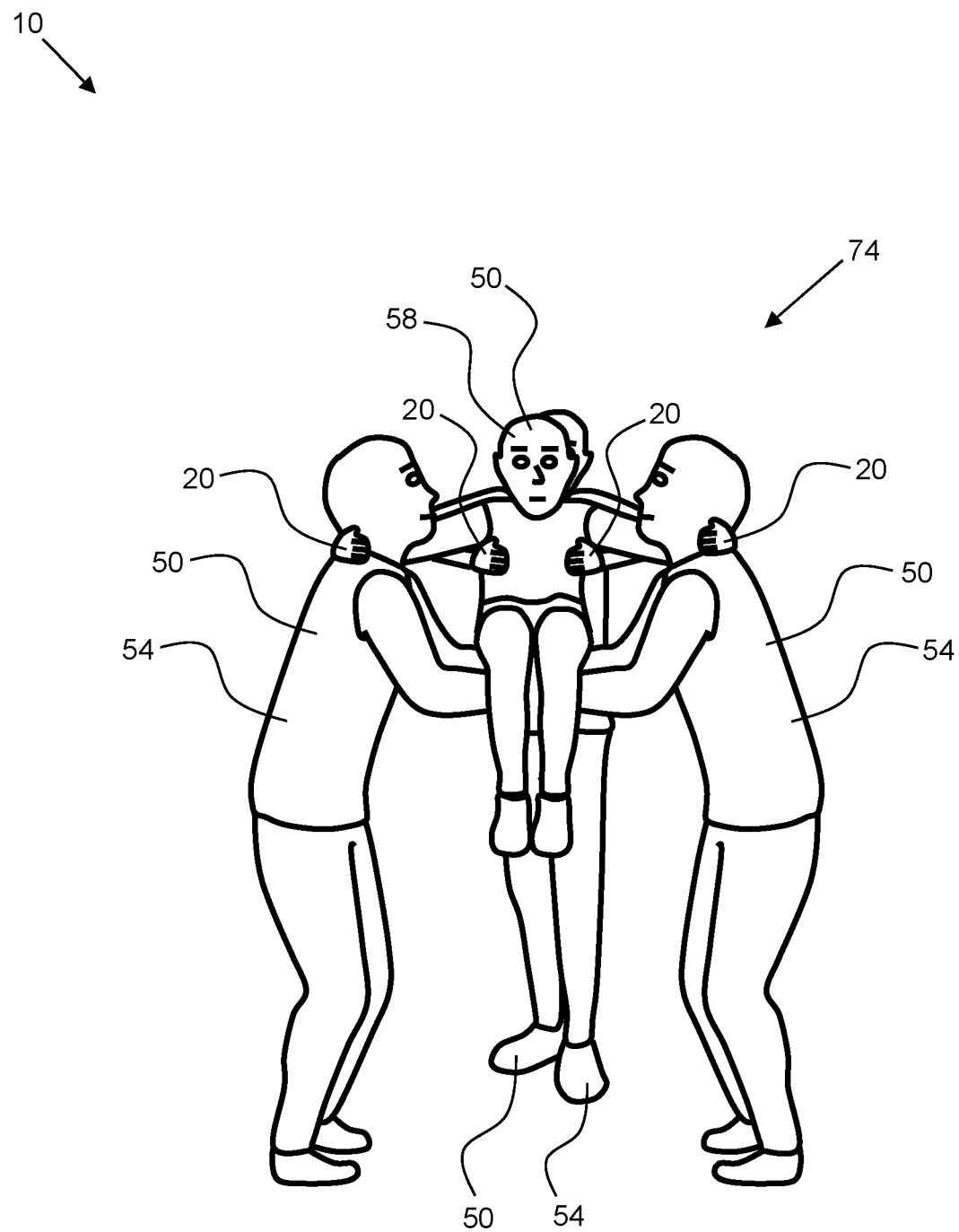
FIG. 5 shows four cheerleaders (3 catchers and 1 flier) in a third position.

As shown in FIG. 5, the four cheerleaders 50 are in a third position 74. The flier 58 has been lowered from the second position to the third position 74 by gravity and/or by the catchers 54. The catchers 54 catch the flier 58 in the third position 74 so that the flier 58 does not hit the ground. The catchers 54 support the flier 58 with their hands and harms. The flier 58 rests their hands on two of the catchers' 54 shoulders. Each cheerleader wears a training glove 20 on each hand, whereby the training gloves 20 may measure the pressures imposed on each of the cheerleaders' hands, as well as the acceleration of each of the cheerleaders' hands.

Figure 6:
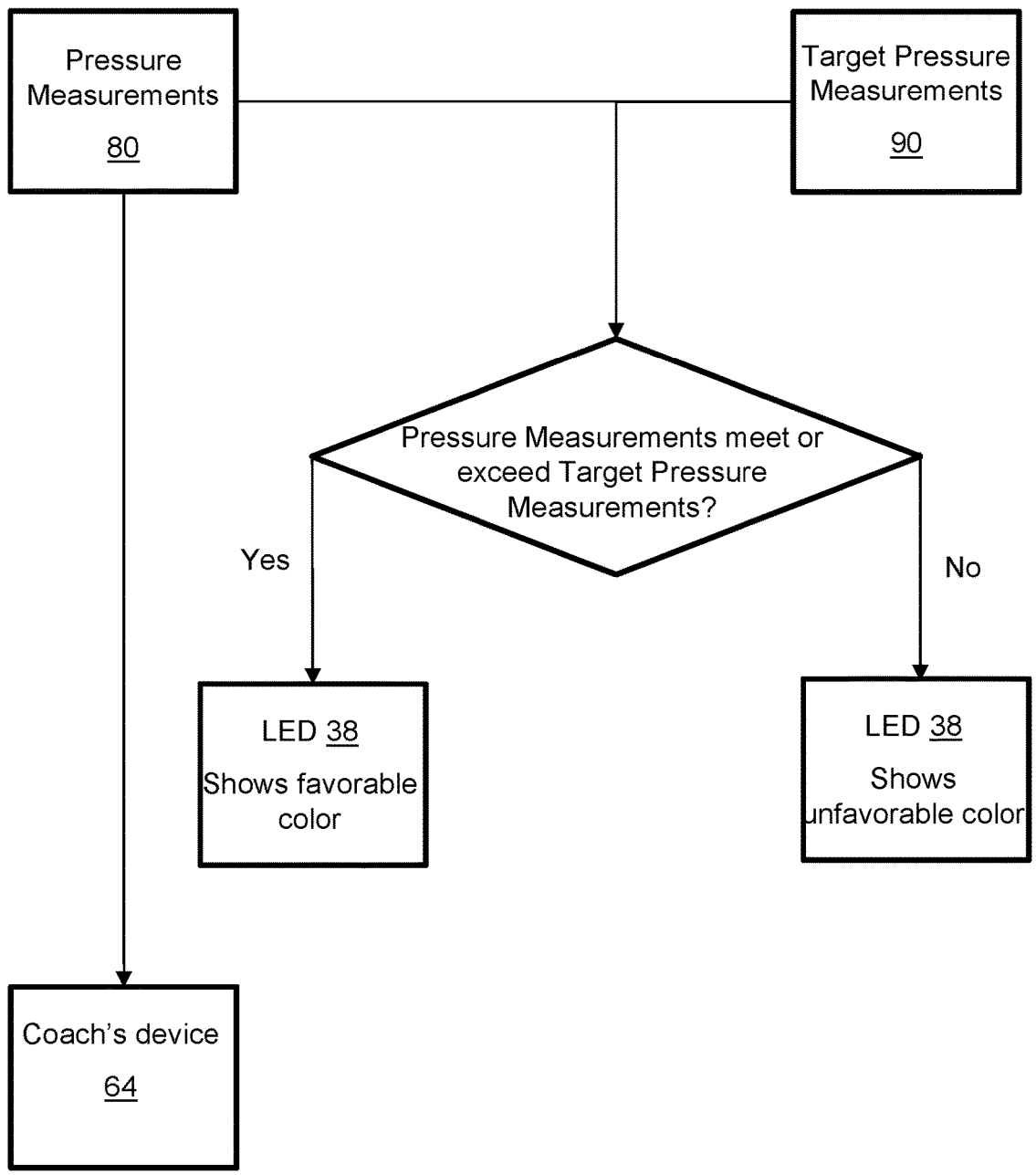
FIG. 6 shows a flowchart of a comparison between pressure measurements and target pressure measurements in a cheerleading training system.

As shown in FIG. 6, pressure measurements 80 obtained from the pressure sensors on the training gloves are compared to target pressure measurements 90. If the pressure measurements 80 of a specific training glove meet or exceed the target pressure measurements 90, the at least one LED 38 of that training glove shows a favorable color. If the pressure measurements 80 of a specific training glove do not meet or exceed the target pressure measurements 90, the at least one LED 38 of that training glove shows an unfavorable color. The pressure measurements 80 may be transmitted to a coach's device 64 by the transmitters of the training gloves.

Figure 7:
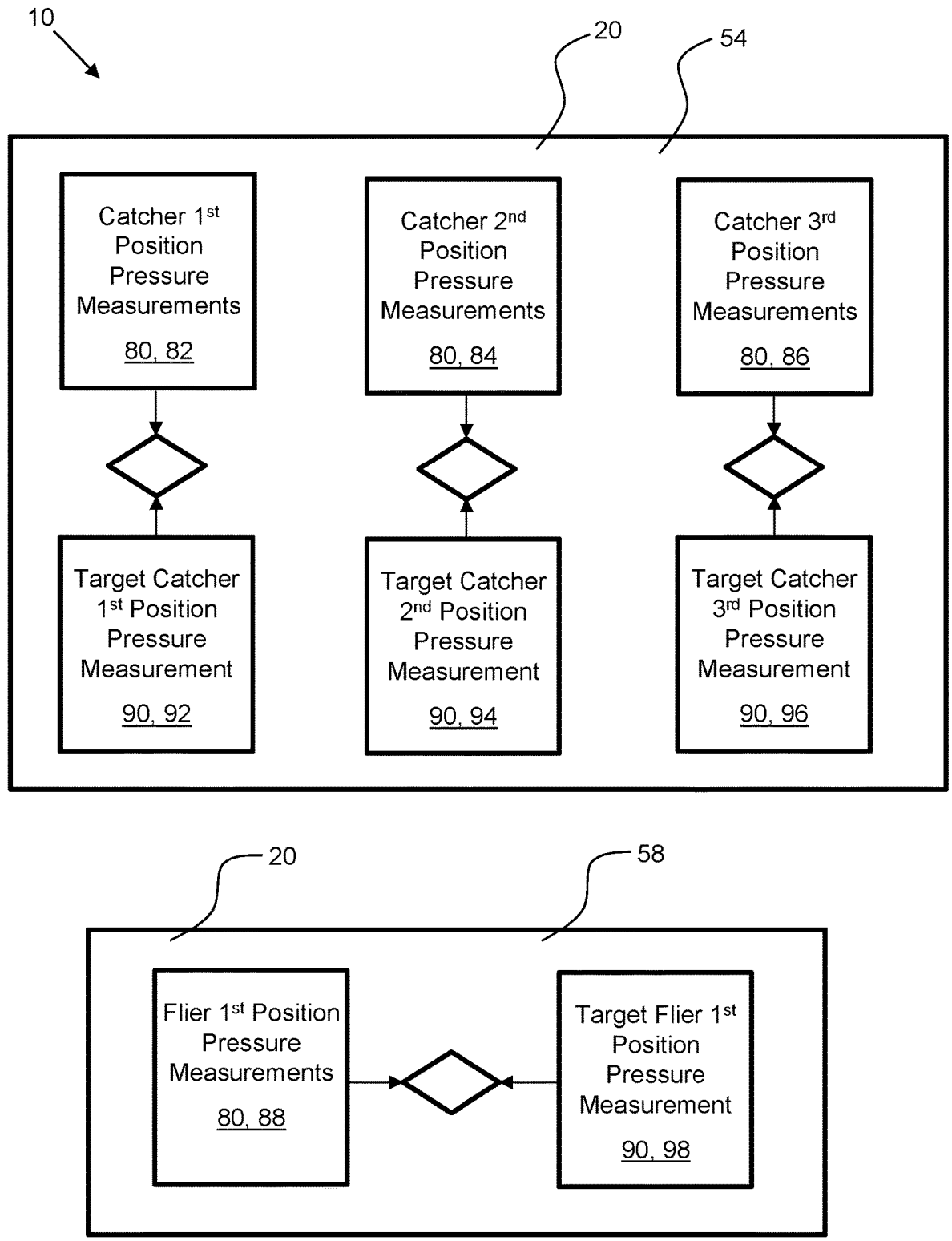
FIG. 7 shows a flowchart of comparisons between specific position pressure measurements and corresponding target pressure measurements in a cheerleading training system.

As shown in FIG. 7, the pressure measurements 80 are catcher first position pressure measurements 82, catcher second position pressure measurements 84, catcher third position pressure measurements 86, and flier first position pressure measurements 88. The target pressure measurements 90 are target catcher first position pressure measurements 92, target catcher second position pressure measurements 94, target catcher third position pressure measurements 96, and target flier first position pressure measurements 98. The catcher first position pressure measurements 82 are compared to the target catcher first position pressure measurements 92. The catcher second position pressure measurements 84 are compared to the target catcher second position pressure measurements 94. The catcher third position pressure measurements 86 are compared to the target catcher third position pressure measurements 96. The flier first position pressure measurements 88 are compared to the target flier first position pressure measurements 98.

The catcher first position pressure measurements 82, catcher second position pressure measurements 84, and catcher third position pressure measurements 86 are obtained by the pressure sensors of the training gloves 20 worn by the catchers 54. The target catcher first position pressure measurements 92, target catcher second position pressure measurements 94, and target catcher third position pressure measurements 96 are stored in the microprocessor of the training gloves 20 worn by the catchers 54. The flier first position pressure measurements 88 are obtained by the pressure sensors of the training gloves 20 worn by the flier 58. The target flier first position pressure measurements 98 are stored in the microprocessor of the training gloves 20 worn by the flier 58.

Figure 8:
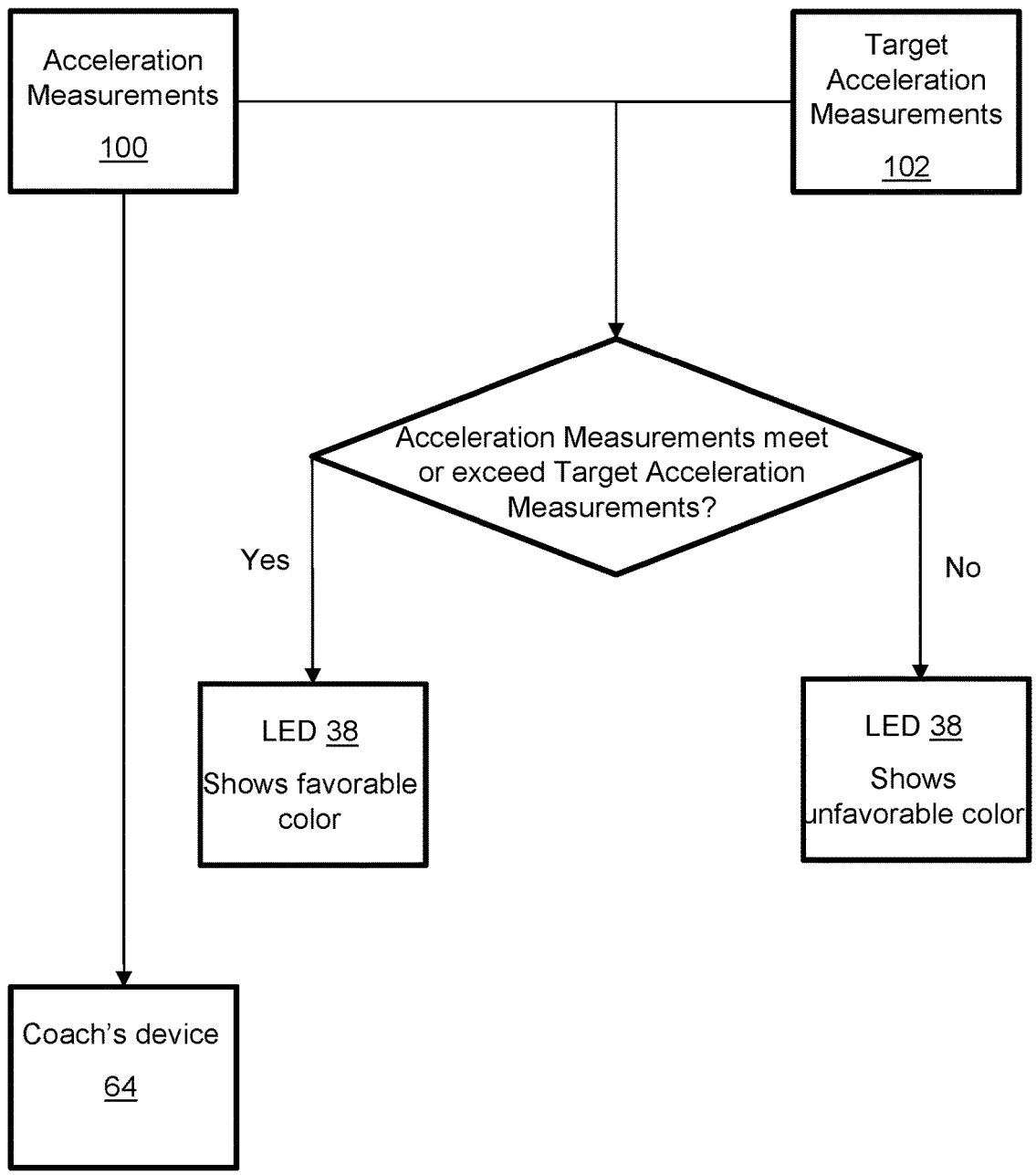
FIG. 8 shows a flowchart of a comparison between acceleration measurements and target acceleration measurements in a cheerleading training system.

As shown in FIG. 8, acceleration measurements 100 (which may be the catcher acceleration measurements described herein) obtained from the accelerometers on the training gloves are compared to target acceleration measurements 102. If the acceleration measurements 100 of a specific training glove meet or exceed the target acceleration measurements 102, the at least one LED 38 of that training glove shows a favorable color. If the acceleration measurements 100 of a specific training glove do not meet or exceed the target acceleration measurements 102, the at least one LED 38 of that training glove shows an unfavorable color. The acceleration measurements 100 may be transmitted to a coach's device 64 by the transmitters of the training gloves.

What is claimed is:

1. A cheerleading training system comprising:
   training gloves, each comprising:
   5 finger portions;
   a palm portion;
   pressure sensors configured in each finger portion and the palm portion;
   at least one LED;
   a microprocessor; and
   target pressure measurements in the form of non-transitory computer-readable media, wherein the target pressure measurements are stored in the microprocessor of each training glove,
   wherein the training gloves are configured to be worn by cheerleaders whereby each cheerleader wears one glove on each hand,
   wherein the cheerleaders are catchers and a flier,
   wherein the training gloves are configured to be worn by the cheerleaders as the catchers cause the flier to be raised from a first position to a second position,
   wherein the training gloves are configured to be worn by the cheerleaders as the flier is lowered from the second position to a third position,
   wherein the training gloves are configured to be worn by the cheerleaders as the catchers catch the flier when the flier is lowered from the second position to the third position,
   wherein the pressure sensors on the training gloves worn by the catchers are configured to obtain catcher first position pressure measurements of the pressures imposed on the catchers' fingers and palms when the flier is in the first position,
      wherein the microprocessor of each training glove worn by the catchers compares the catcher first position pressure measurements of its respective training glove to the target pressure measurements when the flier is in the first position,
      wherein the at least one LED on a training glove worn by the catchers displays a favorable color if the catcher first position pressure measurements obtained by the pressure sensors on said training glove meet or exceed the target pressure measurements,
      wherein the at least one LED on a training glove worn by the catchers displays an unfavorable color if any of the catcher first position pressure measurements obtained by the pressure sensors on said training glove do not meet or exceed the target pressure measurements,
   wherein the pressure sensors on the training gloves worn by the flier obtain flier first position pressure measurements of the pressures imposed on the flier's fingers and palms when the flier is in the first position,
      wherein the microprocessor of each training glove worn by the flier compares the flier first position pressure measurements of its respective training glove to the target pressure measurements when the flier is in the first position,
      wherein the at least one LED on a training glove worn by the flier displays a favorable color if the flier first position pressure measurements obtained by the pressure sensors on said training glove meet or exceed the target pressure measurements,
      wherein the at least one LED on a training glove worn by the flier displays an unfavorable color if any of the flier first position pressure measurements obtained by the pressure sensors on said training glove do not meet or exceed the target pressure measurements,
   wherein the pressure sensors on the training gloves worn by the catchers obtain catcher third position pressure measurements of the pressures imposed on the catchers' fingers and palms when the flier is in the third position,
      wherein the microprocessor of each training glove worn by the catchers compares the catcher third position pressure measurements of its respective training glove to the target pressure measurements when the flier is in the third position,
      wherein the at least one LED on a training glove worn by the catchers displays a favorable color if the catcher third position pressure measurements obtained by the pressure sensors on said training glove meet or exceed the target pressure measurements, and wherein the at least one LED on a training glove worn by the catchers displays an unfavorable color if any of the catcher third position pressure measurements obtained by the pressure sensors on said training glove do not meet or exceed the target pressure measurements.

2. The cheerleading training system of claim 1, wherein the unfavorable color of the at least one LED is configured to be noticed by any of the cheerleaders or a coach in order for adjustments to be made by the cheerleaders with the goal of having all the pressure measurements of all the training gloves meet or exceed the target pressure measurements.

3. The cheerleading training system of claim 1, wherein the catchers are at least 2 catchers.

4. The cheerleading training system of claim 3, wherein the catchers are 3 catchers.

5. The cheerleading training system of claim 1, wherein each training glove further comprises a buzzer, wherein the buzzer of a training glove emits a noise if a pressure measurement obtained by any of the pressure sensors of said training glove does not meet or exceed the target pressure measurements.

6. The cheerleading training system of claim 5, wherein the buzzer of a training glove further vibrates to provide tactile feedback to the cheerleader wearing said training glove if a pressure measurement obtained by any of the pressure sensors of said training glove does not meet or exceed the target pressure measurements.

7. The cheerleading training system of claim 1, wherein the target pressure measurements are adjusted based on the weight of the flier.

8. The cheerleading training system of claim 1, wherein the target pressure measurements have target pressure measurement tolerance bands, wherein, in any training glove, if the pressure measurements obtained by the pressure sensors of said training glove are within the target pressure measurement tolerance bands, the at least one LED of said training glove displays a favorable color, and wherein, in any training glove, if any pressure measurements obtained by the pressure sensors of said training glove are outside of the target pressure measurement tolerance bands, the at least one LED of said training glove displays an unfavorable color.

9. The cheerleading training system of claim 1, wherein the target pressure measurements are:

target catcher first position pressure measurements;
target flier first position pressure measurements; and
target catcher third position pressure measurements, wherein the target catcher first position pressure measurements, target flier first position pressure measurements, and target catcher third position pressure measurements are all different pressure values, wherein the catcher first position pressure measurements are compared to the target catcher first position pressure measurements, wherein the flier first position pressure measurements are compared to the target flier first position pressure measurements, and wherein the catcher third position pressure measurements are compared to the target catcher third position pressure measurements.

10. The cheerleading training system of claim 1, further comprising a coach's device, wherein each training glove further comprises a transmitter, wherein the pressure measurements obtained by the pressure sensors of the training gloves are configured to be transmitted to the coach's device by the transmitter in the form of non-transitory computer-readable media.

11. The cheerleading training system of claim 1, wherein each training glove further comprises:

an accelerometer; and
target acceleration measurements in the form of non-transitory computer-readable media, wherein the target acceleration measurements are stored in the microprocessor of each training glove, wherein the accelerometers on the training gloves worn by the catchers obtain catcher acceleration measurements of the accelerations of the catchers' hands when the catchers cause the flier to be raised from the first position to the second position, wherein the microprocessor of each training glove worn by the catchers compares the catcher acceleration measurements of its respective training glove to the target acceleration measurements, wherein the at least one LED on a training glove worn by the catchers displays a favorable color if the catcher acceleration measurements obtained by the accelerometer on said training glove meet or exceed the target acceleration measurements, and wherein the at least one LED on a training glove worn by the catchers displays an unfavorable color if any of the catcher acceleration measurements obtained by the accelerometer on said training glove do not meet or exceed the target acceleration measurements.

12. The cheerleading training system of claim 1, wherein the pressure sensors on the training gloves worn by the catchers obtain catcher second position pressure measurements of the pressures imposed on the catchers' fingers and palms when the flier is in the second position, wherein the microprocessor of each training glove worn by the catchers compares the catcher second position pressure measurements of its respective training glove to the target pressure measurements, wherein the at least one LED on a training glove worn by the catchers displays a favorable color if the catcher second position pressure measurements obtained by the pressure sensors on said training glove meet or exceed the target pressure measurements, and wherein the at least one LED on a training glove worn by the catchers displays an unfavorable color if any of the catcher second position pressure measurements obtained by the pressure sensors on said training glove do not meet or exceed the target pressure measurements.

13. The cheerleading training system of claim 12, wherein the catchers are at least 2 catchers.

14. The cheerleading training system of claim 12, wherein each training glove further comprises a buzzer, wherein the buzzer of a training glove emits a noise if a pressure measurement obtained by any of the pressure sensors of said training glove does not meet or exceed the target pressure measurements.

15. The cheerleading training system of claim 14, wherein the buzzer of a training glove further vibrates to provide tactile feedback to the cheerleader wearing said training glove if a pressure measurement obtained by any of the pressure sensors of said training glove does not meet or exceed the target pressure measurements.

16. The cheerleading training system of claim 12, wherein the target pressure measurements are adjusted based on the weight of the flier.

17. The cheerleading training system of claim 2, wherein the target pressure measurements have target pressure measurement tolerance bands,
wherein, in any training glove, if the pressure measurements compared to the target pressure measurements are within the target pressure measurement tolerance bands, the at least one LED of said training glove displays a favorable color,
and wherein, in any training glove, if any pressure measurements compared to the target pressure measurements are outside of the target pressure measurement tolerance bands, the at least one LED of said training glove displays an unfavorable color.

18. The cheerleading training system of claim 12, wherein the target pressure measurements are:
a. target catcher first position pressure measurements;
b. target catcher second position pressure measurements;
c. target flier first position pressure measurements; and
d. target catcher third position pressure measurements,
wherein the target catcher first position pressure measurements, target catcher second position pressure measurement, target flier first position pressure measurements, and target catcher third position pressure measurements are all different pressure values,
wherein the catcher first position pressure measurements are compared to the target catcher first position pressure measurements,
wherein the catcher second position pressure measurements are compared to the target catcher second position pressure measurements,
wherein the flier first position pressure measurements are compared to the target flier first position pressure measurements,
and wherein the catcher third position pressure measurements are compared to the target catcher third position pressure measurements.

19. The cheerleading training system of claim 12, further comprising a coach's device, wherein each training glove further comprises a transmitter, wherein the pressure measurements obtained by the pressure sensors of the training gloves are configured to be transmitted to the coach's device by the transmitter in the form of non-transitory computer-readable media.

20. The cheerleading training system of claim 12, wherein each training glove further comprises:
an accelerometer; and
target acceleration measurements in the form of non-transitory computer-readable media, wherein the target acceleration measurements are stored in the microprocessor of each training glove,
wherein the accelerometers on the training gloves worn by the catchers obtain catcher acceleration measurements of the accelerations of the catchers' hands when the catchers cause the flier to be raised from the first position to the second position,
wherein the microprocessor of each training glove worn by the catchers compares the catcher acceleration measurements of its respective training glove to the target acceleration measurements,
wherein the at least one LED on a training glove worn by the catchers displays a favorable color if the catcher acceleration measurements obtained by the pressure sensors on said training glove meet or exceed the target pressure measurements,
and wherein the at least one LED on a training glove worn by the catchers displays an unfavorable color if any of the catcher acceleration measurements obtained by the accelerometer on said training glove do not meet or exceed the target acceleration measurements.

\* \* \* \* \*